Patented Oct. 8, 1929

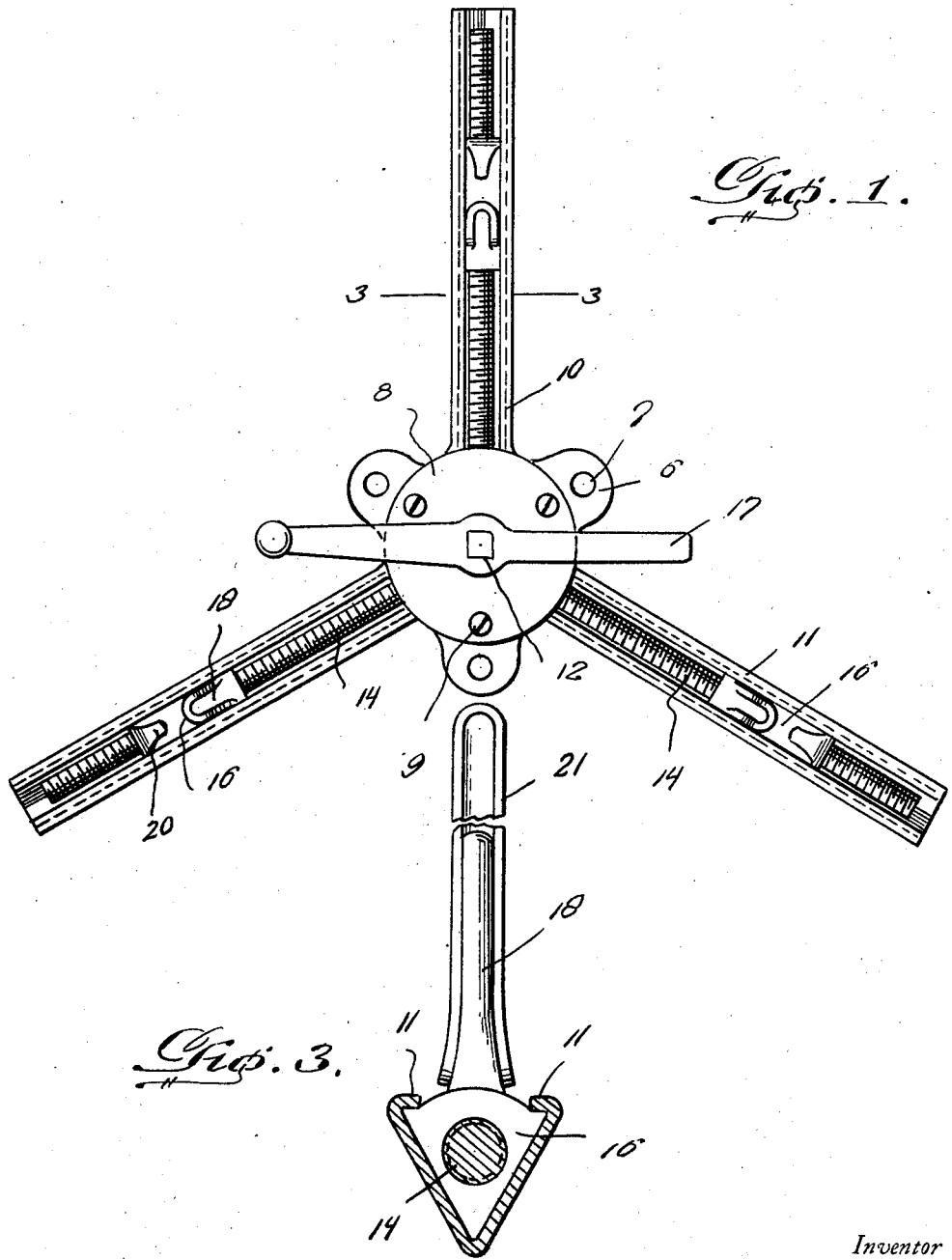

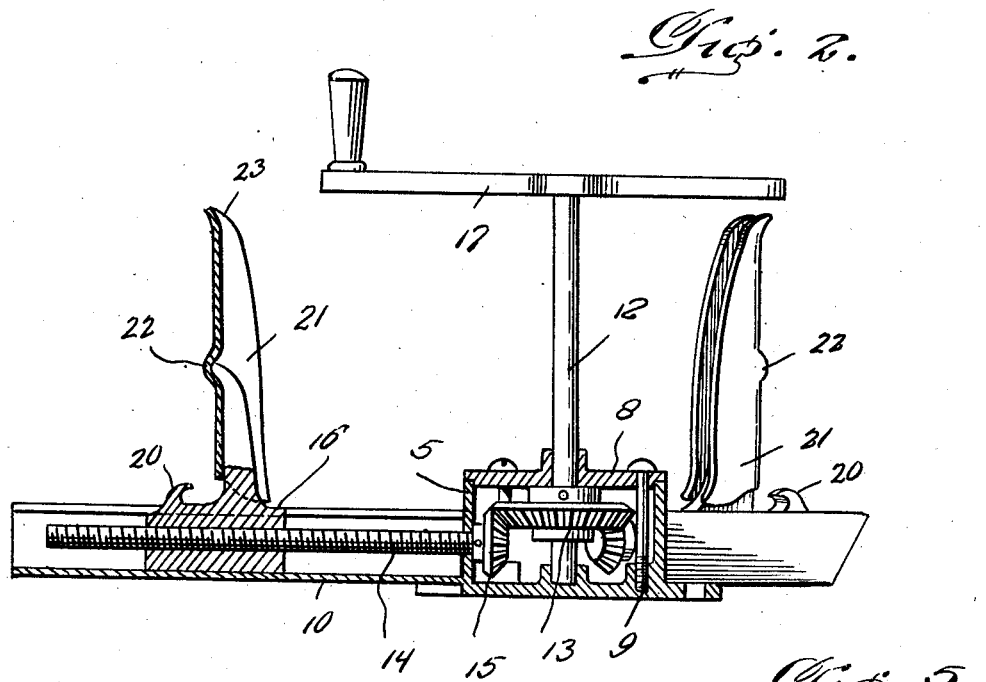
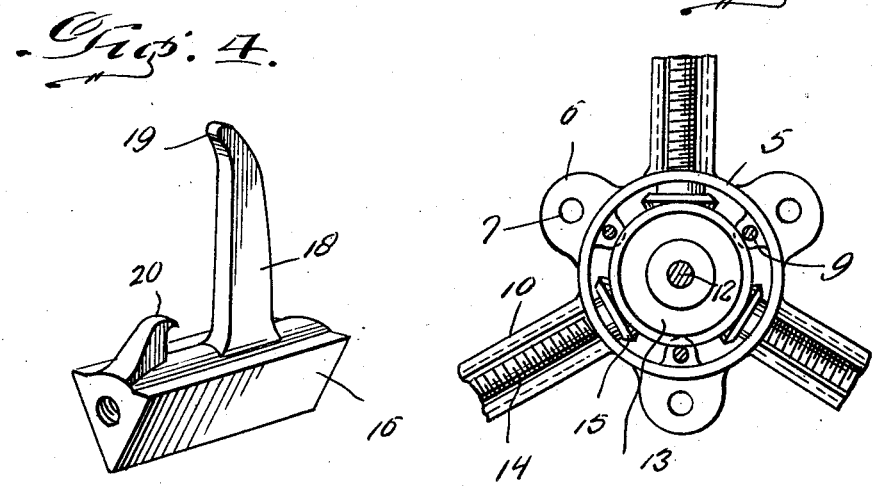

1,730,789

UNITED STATES PATENT OFFICE

JOSEPH E. SMITH, OF CRESCENT CITY, CALIFORNIA

SPARE-TIRE CARRIER AND RIM EXPANDING AND CONTRACTING DEVICE

Application filed June 1, 1928. Serial No. 282,091.

This invention relates to new and useful improvements in devices primarily adapted for the support of a spare tire upon its rim, and secondarily to a device whereby the conventional split rim of the spare tire can be expanded or contracted for securing the tire upon the rim or so releasing the same as to permit the tire to be readily removed therefrom.

An important object of this invention is to provide a device of the aforementioned character that is extremely simple in construction, and that may be arranged upon the rear ends or other convenient points of automobiles in lieu of the usual tire carriers now in use, so that the one device will serve several different purposes.

Furthermore the nature of the invention is such as to permit of the ready removal of a tire from its rim as well as the easy application of the same thereto.

Furthermore means is provided whereby the device can be used in the supporting of a pair of spare tires which is frequently necessary, especially on long trips.

With the foregoing and other objects in view as the nature of the invention will be better understood, the same comprises the novel form, combination and arrangement of parts hereinafter more fully described, shown in the accompanying drawings and claimed.

In the accompanying drawings wherein like reference characters indicate corresponding parts throughout the same:

Figure 1 is an outer side elevation of my improved device.

Figure 2 is a longitudinal view of the device.

Figure 3 is a transverse section of one of the radiating arm members, and its associated structure looking in the direction of the arrows and taken substantially on the line 3—3 of Figure 1.

Figure 4 is a perspective of one of the sliding supporting arm carrying block members, and Figure 5 is a fragmentary plan view of the center of the device, the cover plate of the gear casing being removed.

Now having particular reference to the drawings my novel device consists of a circular gear casing 5 open at its outer end and provided at its inner end with radiating lugs 6 having openings 7 therein whereby to facilitate the attachment of the device to the automobile.

A suitable lid plate 8 is provided for the gear casing, both members 9 being provided for securing the lid in position upon the case as clearly disclosed in Figure 2. Formed integrally with the gear casing 5 are three radially extending V-shaped channel bars 10, the upper edges of the side walls of which are provided with inwardly extending flanges 11—11. Rotatable through a central opening in the lid 8 of the gear casing and journaled at its lower end within a socket in the bottom wall of this casing is an outwardly projecting shaft 12, while keyed thereto within the casing is a large bevel gear 13. Extending radially through openings in the side wall of the gear casing 5 at the inner ends of the channel bars 10 are threaded shafts 14, the inner ends thereof being equipped with small bevel gears 15 having mesh with the first mentioned beveled gear 13. Threaded upon each shaft 14 and slidable within the respective channel bar 10 is a block 16 of V-shape in cross section, said flanges 11—11 of the bar extending over the upper edge thereof for preventing outward movement of the block within said bar.

Obviously the turning movement of the shaft 12 through the medium of a suitable handle or other turning implement 17 in reverse direction will cause the outward or inward movement of said blocks 16.

The top surface of each block 16 is formed adjacent its inner end with an outwardly extending horizontal arm 18, the outer end thereof being turned slightly outwardly to provide a nose or an abutment 19. Obviously these arms are adapted for the support of the spare tire rim, the abutments at the outer ends thereof preventing the sliding of the rim therefrom. The outer surface of each block 16 is further formed adjacent its outer end with a reversely extending hook 20 for engagement over the inner flange of the spare tire rim so that when the blocks 16 are slid inwardly, the rim will be collapsed so that the tire may be readily removed therefrom.

Furthermore, when the rim is in collapsed condition and the same disposed upon the arms of the block after the tire has been arranged thereon, the outward movement of the blocks will cause the expansion of the rim to tightly secure the tire in position thereon.

In order that a pair of spare tires may be disposed upon the arms 18, there is provided for each arm an extension 21. Each extension is in the form of a casting or heavy sheet metal of a predetermined length and substantially U-shape in cross section, the inner ends thereof adapted to be arranged over the said arms 18, the central portions thereof being in each instance formed intermediate the ends of the extension with an outwardly projecting tit 22 so as to provide an interior pit for receiving the upturned abutment 19 of the respective supporting arm 18 as clearly disclosed in Figure 2. Furthermore, the outer end of each extension is slightly turned upwardly to provide an abutment 23 so as to prevent the outermost tire from slipping off of the extension when properly disposed therein.

In view of the foregoing description when considered in conjunction with the accompanying drawings, it will be apparent that I have provided a novel, simple and extremely useful spare tire carrier that is also adaptable for use in the expansion or contraction of the conventional split rims upon which the spare tires are arranged.

Even though I have herein shown and described the invention as consisting of certain detail structural elements, it is nevertheless to be understood that minor changes in the size, shape and arrangement may be made without departing from the spirit and scope of the appended claim.

Having thus described the invention, what I claim as new is:—

In a combined tire carrier and changer, a plurality of blocks slidable toward and away from a common center, means for sliding the blocks, an arm carried by each block having a hooked end, and a tire receiving member detachably associated with each arm including a body substantially U-shaped in cross section for straddling the arm and having a recess intermediate its ends for receiving the hooked end of the arm.

In testimony whereof I affix my signature.

JOSEPH E. SMITH.